United States Patent [19]

Shindou

[11] Patent Number: 5,339,160
[45] Date of Patent: Aug. 16, 1994

[54] CHARACTER DISPLAY DEVICE FOR SYNCHRONIZING OPERATION OF VIDEO RAM TO OPERATION OF CPU

[75] Inventor: Hiroyasu Shindou, Moriguchi, Japan
[73] Assignee: Sanyo Electric Co., Ltd., Osaka, Japan
[21] Appl. No.: 48,734
[22] Filed: Apr. 16, 1993
[30] Foreign Application Priority Data
  Apr. 24, 1992 [JP] Japan .................. 4-106608
[51] Int. Cl.⁵ .............. H04N 5/445; H04N 7/08
[52] U.S. Cl. ................ 348/571; 345/190; 345/200; 395/164; 348/473; 348/476; 348/500
[58] Field of Search ............. 358/147, 142, 146, 188, 358/183, 160, 148, 149; 340/723, 799; 395/110, 115, 162, 164; 345/189, 190, 200, 200, 193; H04N 5/445, 5/44, 7/08, 7/087

[56] References Cited
U.S. PATENT DOCUMENTS
4,581,611 4/1986 Yang et al. ............ 340/799 X
4,646,077 2/1987 Culley ................... 340/799 X
4,658,294 4/1987 Park ....................... 358/142
4,748,504 5/1988 Ikeda et al. .............. 358/142

FOREIGN PATENT DOCUMENTS
55-045246 3/1980 Japan ..................... 358/142
62-178084 8/1987 Japan ................... H04N 7/08

Primary Examiner—James J. Groody
Assistant Examiner—Safet Metjahic
Attorney, Agent, or Firm—Spensley Horn Jubas & Lubitz

[57] ABSTRACT

Specific clock periods in each machine cycle MC used by a CPU are used for accessing a video RAM synchronized with the operation of the operation of the CPU and the remaining clock periods of the machine cycle MC are used for accessing the video RAM synchronized with horizontal scanning and vertical scanning of television signal. Therefore, accessing synchronized with television signals is also performed in response to clock periods of a machine cycle MC and the video RAM can be made of a single port.

8 Claims, 2 Drawing Sheets

CHARACTER DISPLAY DEVICE FOR SYNCHRONIZING OPERATION OF VIDEO RAM TO OPERATION OF CPU

BACKGROUND OF THE INVENTION

1. Field of the Invention

This invention relates to a character display device for displaying characters on a television screen.

2. Description of the Related Art

In recent years, in the United States of America, televisions having a so-called closed caption function have been put into commercial products for persons who have difficulty in hearing. This closed caption function is a function which displays a conversation, an announcement, or the like on television with a caption on a screen in real time, and when image information stored on record media, such as magnetic tape or magnetic disk, is reproduced, displays a conversation in the image information with a caption on the screen. That is, the function enables the user to select a caption display method as he or she desires. The system resembles multiplexed text broadcasting in Japan. Caption data for a caption in image information transmitted from a broadcasting station or reproduced from record media is carried on a predetermined horizontal scanning line (for example, the 21st horizontal scanning line) within a vertical blanking interval in the television signals. The caption data is decoded by the closed caption function, thereby displaying captions on the television screen.

The circuitry for providing the closed caption function is put into an IC which is contained in a television. The IC contains a video RAM (random access memory), character ROM (read-only memory), etc., for caption display. For example, the closed caption function provides caption display modes such as a text mode which displays 32-character×15-row information on a full television screen and a caption mode which can display 32-character×4-row information in a desired area of a television screen. When caption data in the text mode is decoded, character codes for 32 characters×15 rows are generated; when caption data in the caption mode is decoded, character codes for 32 characters×4 rows are generated. The video RAM mentioned above stores the character codes and consists of at least 480 (=32×15) addresses conforming to the text mode which requires a storage capacity larger than the caption mode. The 480 addresses of the video RAM correspond to character display locations of a maximum of 32 characters×15 rows displayed on the television screen on a one-to-one basis. Therefore, the video RAM is accessed in synchronization with horizontal and vertical synchronizing signals contained in television signals. The character ROM mentioned above stores data of character fonts (each consisting of horizontal m dots×vertical n dots) for predetermined characters that can be displayed on the television screen, and is accessed according to character codes in the video RAM. The corresponding character data is output from the character ROM. Since one row provides 32 character positions and one horizontal scanning line is one dot line, a dot pattern of horizontal m dots of character data is read for 32 characters in the horizontal direction and then repeated n times in sequence in the vertical direction.

As described above, caption data is carried within vertical blanking intervals of video signals, thus is updated at least in frame units. This means that a write and read of character codes into and from the video RAM are repeated in response to update of caption data. A microcomputer is used to write a character code into the video RAM and to read the character code for monitoring. For this reason, the write and read are executed in synchronization with a machine cycle in which the microcomputer performs operations. On the other hand, a read of a character code from the video RAM for on-screen display must correspond to each character display location as a matter of course, thus it is executed in synchronization with horizontal and vertical synchronizing signals.

An access when a character code is written into the video RAM and an access when the character code is read from the video RAM for display are executed asynchronously. Therefore, hitherto, a dual port RAM which can be accessed asynchronously for writing a character code and for reading it for display has been used as the video RAM.

However, if the video RAM is made up of dual ports, the number of input/output lines and the number of address decoders to access the video RAM increases, thus increasing the IC chip area and production costs. To suppress an increase in the chip area and a rise in cost, the character display area of one screen is divided into several portions and the video RAM can be made of a dual port RAM having the minimum display capacity which enables characters to be displayed on each division. However, this configuration requires that the storage contents of the video RAM should be changed each time the divisions are switched, and so program processing by the microcomputer becomes complicated.

SUMMARY OF THE INVENTION

Accordingly, it is an object of the invention to provide a character display device whose video RAM is made of a single port for writing character codes and reading them for display in a good manner.

To this end, according to the invention, there is provided a character display device for displaying characters on a television screen comprising:

a CPU which executes a series of processing steps in sequence;

first address signal generation means for generating a first address signal in response to CPU operation timing;

second address signal generation means for generating a second address signal in synchronization with horizontal scanning and vertical scanning of television signals;

address change means for receiving the first and second address signals and outputting either of the signals;

a video RAM being accessed according to the first or second address signal output from the address change means, the video RAM into or from which data for character display on the television screen is written or read; and television signal generation means for generating television signals to display characters on the television screen in response to data read from the video RAM.

Both the first address signal based on the CPU operation timing and the second address signal synchronized with the television signal are generated. Both the address signals are changed by the address change means. Then, an input/output port of the video RAM can be used for both an access according to the first address signal and an access according to the second address signal.

The address change means is responsive to the CPU operation timing for selecting output of the first or second address signal.

Since the timing of an access to the video RAM according to the second address signal is controlled in response to the CPU operation timing, the CPU operation is not adversely affected.

The CPU executes a series of processing steps in sequence according to machine cycles each being made up of a plurality of clock periods and the address change means assigns some of the clock periods to a period during which the first address signal is output and the remainder of the clock periods to a period during which the second address signal is output.

Since some of predetermined clock periods are assigned to an access to the video RAM and the remaining clock periods are assigned to another access to the video RAM, no problem occurs on the CPU operation.

The video RAM has addresses corresponding to locations of the television screen and stores a character code of a display character in each of the addresses.

The television signal generation means includes a character ROM which is accessed according to a character code for outputting dot matrix data of the character corresponding to the character code.

The data stored in the character ROM is data for a dot pattern of a character.

The television signal generation means includes a latch circuit which latches a dot pattern of a character read from the character ROM and a shift register in which the contents of the latch circuit are set each time an address of the second address signal is changed, the shift register for outputting the contents of the latch circuit in synchronization with horizontal scanning of television signal.

Thus, television signals to display character data can be generated.

Data change means is located on a data input/output route of the video RAM for connecting the video RAM to the CPU when the video RAM is accessed based on the first address signal and the video RAM to the television signal generation means when the video RAM is accessed based on the second address signal.

Input/output of the video RAM is a single port through which the video RAM is accessed according to both the first and second address signals.

Since the video RAM is made of a single port, the number of input lines to the video RAM can be reduced and the number of address decoders can also be decreased. Therefore, the IC chip area where the circuitry is mounted can be made small and production costs can be lowered.

DESCRIPTION OF THE PREFERRED EMBODIMENT

The invention is described in detail specifically in conjunction with the accompanying drawings.

Figure 1:
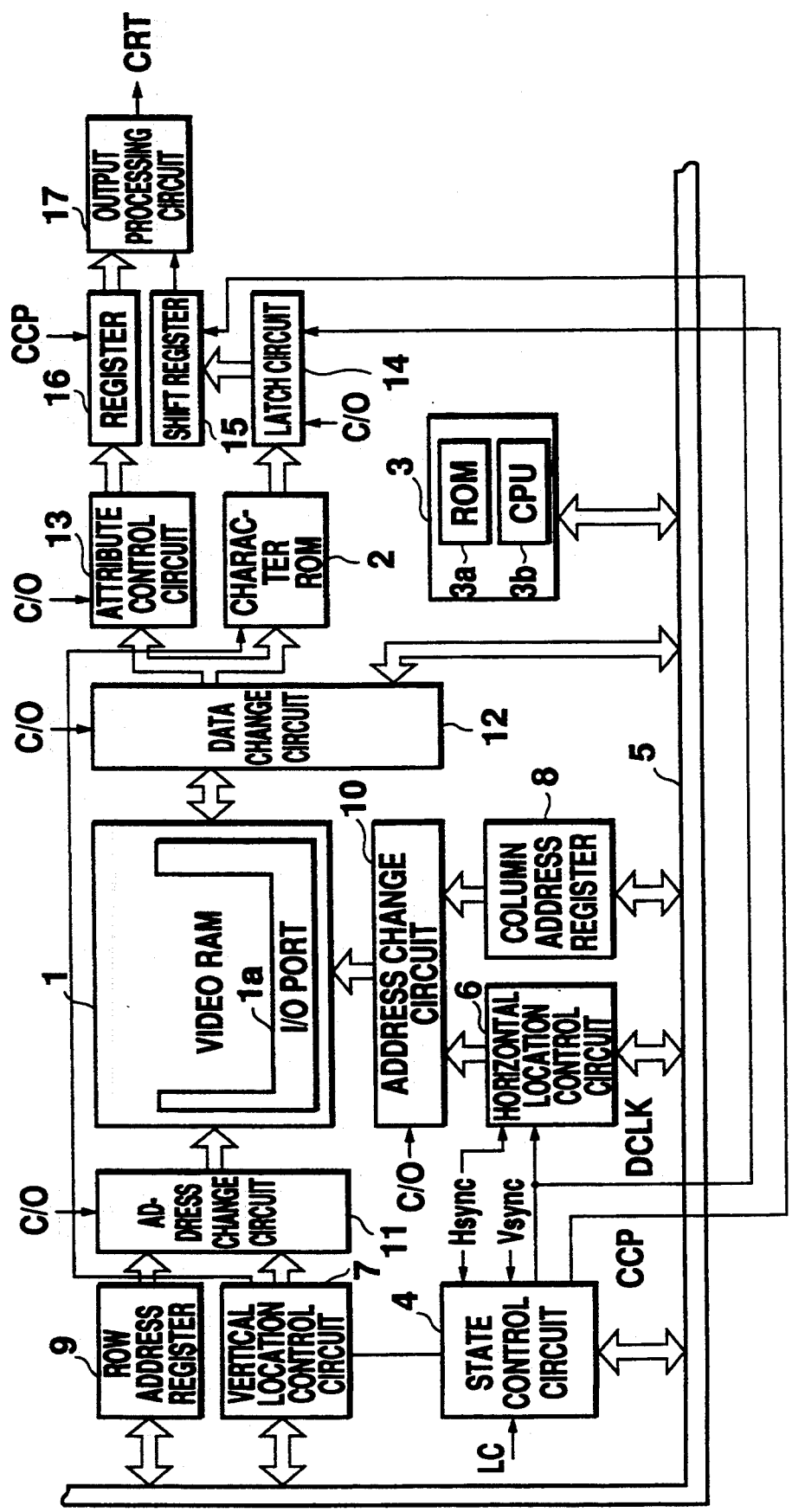
FIG. 1 is a block diagram showing a configuration example of a character display device according to the invention.

FIG. 1 is a block diagram showing a character display device according to the invention, wherein for example, caption display by the closed caption function is described.

In FIG. 1, numeral 1 is a video RAM which is comprising a single port, namely, the video RAM has only one I/O port (1a) for data input/output. As described in "Description of the Related Art", the closed caption function provides a text mode and a caption mode for character display. The text mode displays 32 characters×15 rows on a full television screen and the caption mode displays 32 characters×4 rows in any desired area of the television screen, either mode of which can be selected by the user as desired. In the text mode and the caption mode, codes such as character codes generated by decoding caption data carried within vertical blanking intervals of television signals and attribute codes for character qualification are written into and read from the video RAM 1. The video RAM 1 consists of at least 480 (=32×15) addresses conforming to the text mode which requires a storage capacity larger than the caption mode, and the addresses correspond to character display locations of 32 characters×15 rows on a one-to-one basis. Therefore, to display characters on the television screen, the video RAM 1 is accessed in synchronization with horizontal scanning and vertical scanning of television signals. Then, the character corresponding to a character code read from the video RAM 1 is displayed at the position on the television screen corresponding to the read timing.

Each address of the video RAM 1 consists of eight bits. A character code is represented by 8-bit data in the range of 00H-7FH (H: Hexadecimal) and an attribute code is represented by 8-bit data in the range of 80H-FFH. Therefore, whether a code stored in the video RAM 1 is a character code or attribute code is determined by the most significant bit (MSB) of the code: If the MSB of 8-bit data is 0, the 8-bit data is judged to be a character code; if the MSB of 8-bit data is 1, the 8-bit data is judged to be an attribute code.

Numeral 2 is a character ROM which stores character data to display characters on the television screen as predetermined characters (each consisting of horizontal m dots×vertical n dots). M-dot data of a specific row (specific vertical location) of the character specified by a character code read from the video RAM 1 is output. The vertical location is determined by an address signal of a vertical location control circuit 7. Then, when a predetermined address of the character ROM 2 is accessed, a dot pattern of horizontal m dots of the character data stored at the address is displayed on the corresponding horizontal scanning line. Therefore, display of one character is completed by reading n-line data in the vertical direction. On one horizontal scanning line, m-dot data is read from each of 32 characters.

Numeral 3 is a microcomputer where a CPU (central processing unit) 3b performs operations according to program data read from a program ROM 3a. The CPU 3b performs a sequence of operations in machine cycle (MC) units determined for the CPU 3b. A machine cycle is made up of, for example, six clock periods during which data is read or written or an operation is performed. The periods are determined based on the basic clock of the CPU 3b.

Numeral 4 is a state control circuit to which an oscillation clock LC, a horizontal synchronizing signal Hsync, and a vertical synchronizing signal Vsync are applied for generating signals to control the operation of the circuitry shown in FIG. 1. The state control circuit 4 generates a dot clock DCLK which synchronizes with the horizontal synchronizing signal Hsync and whose period is repeated for each horizontal dot of character data in response to the oscillation clock LC. The circuit 4 also generates a character change pulse CCP every horizontal m dots of the character data in response to the dot clock DCLK. Furthermore, the state control circuit 4 is connected via a bus 5 to the CPU 3b, and changes the mode between the text mode and caption mode in response to operation processing data of the CPU 3b.

Numeral 6 is a horizontal location control circuit which generates address signals to access the video RAM 1 during the horizontal scanning period of television signals. The horizontal location control circuit 6 is provided with a register and a counter. Data indicating the horizontal character display start position is set in the register by the CPU 3 via the bus 5. That is, the number of dot clocks DCLKs required from generation of a horizontal synchronizing signal Hsync to arriving at the character display start position for each horizontal scanning period is set in the register in binary form. the counter performs a count-up operation in binary form in synchronization with the dot clock DCLK and is reset in response to the horizontal synchronizing signal Hsync. Therefore, the horizontal location control circuit 6 outputs an address signal incremented each time the counter counts m dot clocks DCLKs after counting the contents of the register, thereby providing the address signal corresponding to the display location of each character on a horizontal scanning line.

Numeral 7 is a vertical location control circuit which, like the horizontal location control circuit 6, generates address signals to access the video RAM 1 during the scanning period of television signals. The vertical location control circuit 7 is also provided with a register and a counter. Data indicating the vertical character display start position is set in the register by the CPU 3 via the bus 5. That is, the number of horizontal synchronizing signals Hsync required from generation of the first horizontal scanning line to the horizontal scanning line of the character display start position for each field is set in the register in binary form. The counter performs a count-up operation in binary form in synchronization with the horizontal synchronizing signal Hsync and is reset in response to the vertical synchronizing signal Vsync. Therefore, the vertical location control circuit 7 outputs an address signal incremented each time the counter counts n horizontal synchronizing signals Hsync after counting the contents of the register. An address of the video RAM 1 is specified by a combination of address signals output from the horizontal location control circuit 6 and the vertical location control circuit 7, called second address signal, and an access to the video RAM 1 is enabled. The second address signal is a signal synchronized with horizontal and vertical synchronizing television signals, and is used when a character code written into the video RAM 1 is read for screen display.

Numeral 8 is a column address register in which an address signal to access the video RAM 1 is set by the CPU 3 via the bus 5 in response to the decoding result of caption data. Numeral 9 is a row address register in which an address signal to access the video RAM 1 is set by the CPU via the bus 5 as with the column address register 8. The video RAM 1 can be accessed according to a combination of the address signals set in the column and row address registers 8 and 9 (first address signal). This first address signal is used when a character code is written into the video RAM 1 or when a character code is read from the video RAM 1 for monitoring. As described above, the second address signal is generated in synchronization with horizontal scanning and vertical scanning of television signals, while the first address signal is generated in synchronization with the operation of the CPU 3. That is, the first and second address signals are generated asynchronously.

Numeral 10 is an address change circuit which changes address signals generated from the horizontal location control circuit 6 and the column address register 8 for output. A change signal C/O to change both the address signals for output is applied to the address change circuit 10. The change signal C/O is a square wave signal set low (L) or high (H) for each of one to six clock periods making up each machine cycle of the CPU 3. When the change signal C/O is L, the address change circuit 10 outputs the address signal generated by the horizontal location control circuit 6. When the change circuit C/O is H, the address change circuit 10 outputs the address signal set in the column address register 8. For example, when a machine cycle MC is made up of six clock periods, the change signal C/O is designed so that it is set L during the first, third, and fifth clock periods of the machine cycle MC and is set H during the second, fourth, and sixth clock periods of the machine cycle MC. Then, the address signals generated by the horizontal location control circuit 6 and set in the column address register 8 are read into the video RAM 1 alternately three times in the machine cycle MC. As described above, the address signals in the horizontal location control circuit 6 and the column address register 8 are generated asynchronously, but both the address signals changed by the address change circuit 10 are generated in synchronization with the operation of the CPU 3, namely, in machine cycle MC units.

Likewise, numeral 11 is an address change circuit which changes address signals generated from the vertical location control circuit 7 and the row address register 9 for output. A change signal C/O is applied to the address change circuit 11. The address signals generated by the vertical location control circuit 7 and set in the row address register 9 are read into the video RAM 1 alternately three times in a machine cycle MC. The address signals in the vertical location control circuit 7 and the row address register 9 are generated asynchronously, but both the address signals changed by the address change circuit 11 are generated in synchronization with the operation of the CPU 3. Thus, when the change signal C/O is L, both the address signals in the horizontal and vertical location control circuits 6 and 7, namely, the second address signal is read into the video RAM 1; when the change signal C/O is H, both address signals in the column and row address registers 8 and 9, namely, the first address signal is read into the video RAM 1. Therefore, the corresponding addresses of the video RAM 1 are each accessed three times by the first and second address signals in each machine cycle MC.

Numeral 12 is a data change circuit for writing and reading code data into and from the video RAM 1. A change signal C/O is applied to the data change circuit 12. When the change signal C/O is H, the video RAM 1 is accessed with the first address signal and the character code or attribute code generated by the CPU 3 which decodes caption data is written via the data change circuit 12 into the corresponding address of the video RAM 1 or the code stored in the corresponding address of the video RAM 1 is read via the data change circuit 12 into the CPU 3 for monitoring. When the change signal C/O is L, the video RAM 1 is accessed with the second address signal and the code stored in the corresponding address of the video RAM 1 is read via the data change circuit 12 into the character ROM 2 or an attribute control circuit 13 (described below). That is, character code is transferred to the character ROM 2 as address signal and attribute code is read into the attribute control circuit 13.

Numeral 13 is the above-mentioned attribute control circuit which decodes attribute codes and outputs attribute control data for character qualification for each character. When the low-to-high transition of the change signal C/O is made, the attribute control data is held.

Numeral 14 is an m-bit latch circuit which holds a dot pattern of horizontal m dots of character data read from the character ROM 2. A change signal C/O is applied to the latch circuit. When the low-to-high transition of the change signal C/O is made, the latch circuit 14 performs latch operation. Assume that the dot pattern is represented by data set to 1 when a dot exists and 0 when no dot exists. Numeral 15 is a shift register where m-bit data output from the latch circuit 14 is set in synchronization with a character change pulse CCP, and is then output in series in synchronization with a dot clock DCLK. Numeral 16 is a register in which the attribute control data output from the attribute control circuit 13 is set in synchronization with a character change pulse CCP. Numeral 17 is an output processing circuit which processes the m-bit data output from the shift register 15 and the attribute control data output from the register 16 and outputs RGB signals. The latch circuit 14, the shift register 15, the register 16, and the output processing circuit 17 make up an output circuit. The output operation of the character ROM 2 and attribute control circuit 13 is synchronized with the operation of the CPU 3, while the operation of the output processing circuit 17 is synchronized with horizontal scanning and vertical scanning of television signals. This provides RGB signals for displaying the characters corresponding to the character codes stored in the video RAM 1 under the conditions corresponding to the attribute codes stored in the video RAM 1. The RGB signals are supplied to the CRT.

Figure 2:
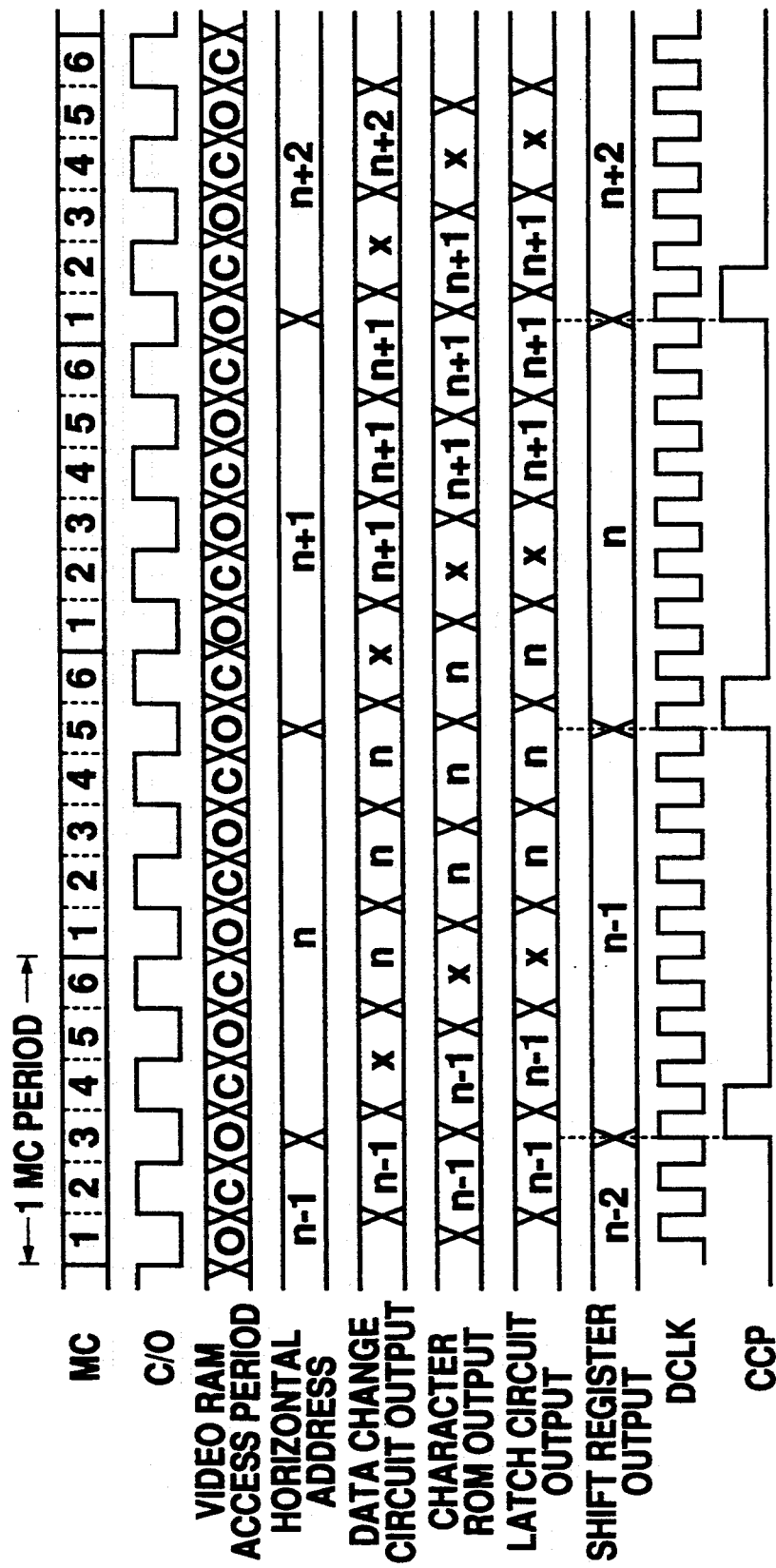
FIG. 2 is a timing chart showing the signal state in sections of the character display device.

The operation of the character display device shown in FIG. 1, particularly for reading code stored in the video RAM 1 and displaying it on the television screen only for one horizontal scanning, is described in conjunction with FIG. 2. Assume that the number of horizontal dots of each character in the character ROM 2 is eight.

The state control circuit 4 generates dot clock DCLK of a predetermined frequency in synchronization with horizontal scanning of television signals. Whenever counting eight dot clocks DCLKs, the state control circuit 4 generates a character change pulse CCP. The horizontal location control circuit 6 increments the horizontal address signal on each rising edge of the character change pulse CCP. n−1, n, n+1, n+2, ... denote horizontal addresses in the video RAM 1. On the other hand, when a machine cycle MC made up of one to six clock periods is generated to execute operations by the CPU 3b, a change signal C/O like a square wave is generated which is set L during the first, third, and fifth clock periods of each machine cycle MC and H during the second, fourth, and sixth clock periods. When the change signal C/O is L, the second address signal output from the horizontal and vertical location control circuits 6 and 7 is supplied via the address change circuits 10 and 11 to the video RAM 1, and an access to the address is enabled. When the change signal C/O is H, the first address signal in the column and row address registers 8 and 9 is supplied via the address change circuits 10 and 11 to the video RAM 1, and an access to the address is enabled. C and O indicate video RAM 1 output denote access periods with the first and second address signals respectively.

When the address signal generated by the horizontal location control circuit 6 is read into the video RAM 1 in video RAM 1 access period O, the character code or attribute code corresponding to the address signal is read out from the video RAM 1 when the change signal C/O is L. The code read from the video RAM 1 is latched on the rising edge of the change signal C/O (from L to H), and is output from the data change circuit 12. The data change circuit 12 supplies data obtained by an access with the second address signal to the attribute control circuit 13 or the character ROM 2. If the code read from the video RAM 1 is a character code, the character code is read into the character ROM 2 and the 8-bit data corresponding to the character code is output from the character ROM 2. The 8-bit data is latched in the latch circuit 14 when the low-to-high transition of the change signal C/O is made. When the low-to-high transition of character change pulse CCP is made, the latch contents of the latch circuit 14 are output in parallel and fed into the shift register 15. The contents of the shift register 15 are output in series in synchronization with a dot clock DCLK and are subjected to a predetermined signal treatment by the output processing circuit 17 for expansion to a dot pattern. Thus, when caption characters are displayed on the screen, good on-screen display can be made in synchronization with horizontal scanning of television signals although the video RAM 1 is accessed in synchronization with the operation of the CPU 3. Since the address signal in the vertical location control circuit 7 does not change during the horizontal scanning period of television signals, its timing chart is omitted. If the address signal in the horizontal location control circuit 6 changes during video RAM 1 access period 0, the code read from the video RAM 1 becomes an undefined code x. However, no problem arises because the address signal in the horizontal location control circuit 6 is read into the video RAM 1 three times repeatedly in each machine cycle MC and defined code is securely generated just after the undefined code x is generated from the video RAM 1.

Since specific clock periods within each machine cycle MC used by the CPU 3 are used for accessing the video RAM 1 synchronized with the operation of the CPU 3 and the remaining clock periods in each machine cycle MC are used for accessing the video RAM 1 synchronized with horizontal scanning and vertical scanning of television signals, the video RAM 1 can be made of a single port. Therefore, if the circuitry shown in FIG. 1 is made up of an IC, an increase in the IC chip area and a rise in production costs can be suppressed. Furthermore, since the video RAM 1 can have a character storage capacity for one screen, program processing by the microcomputer for video RAM 1 write operation and read operation can be made easy.

What is claimed is:

1. In a character display device for displaying characters on a television screen, the improvement comprising:
a CPU which executes a series of processing steps in sequence according to machine cycles, each machine cycle being made up of a first portion coincident with a first plurality of clock periods and a second portion coincident with a second plurality of clock periods:
first address signal generation means for generating a first address signal in response to CPU operation timing:
second address signal generation means for generating a second address signal in synchronization with horizontal scanning and vertical scanning of television signals;
address change means coupled to said first address signal generation means and said second address signal generation means and controlled according to clock periods of the machine cycles for alternately outputting the first address signal during the first portion of one machine cycle and selectively outputting said second address signal during the second portion of the one machine cycle;
a video RAM being accessed according to said first or second address signal output from said address change means in synchronism with clock periods of the machine cycles, said video RAM having data for character display on the television screen written therein or read therefrom; and
television signal generation means for generating television signals to display characters on the television screen in response to data read from said video RAM.

2. The character display device as claimed in claim 1 wherein said video RAM has addresses corresponding to locations of the television screen and stores a character code of a display character in each of the addresses.

3. The character display device as claimed in claim 2 wherein said television signal generation means includes a character ROM which is accessed according to a character code for outputting display data of a character corresponding to the character code.

4. The character display device as claimed in claim 3 wherein display data stored in said character ROM is data for a dot pattern of a character.

5. The character display device as claimed in claim 4 wherein said television signal generation means includes a latch circuit which latches a dot pattern of a character read from said character ROM and a shift register in which contents of said latch circuit are set each time an address of said second address signal is changed, said shift register for outputting the contents of said latch circuit in synchronization with horizontal scanning of television signal.

6. The character display device as claimed in claim 1 wherein data change means is located on a data input/output route of said video RAM for connecting said video RAM to said CPU when said video RAM is accessed based on the first address signal and connecting said video RAM to said television signal generation means when said video RAM is accessed based on the second address signal.

7. The character display device as claimed in claim 1 wherein input/output of said video RAM is a single port through which said video RAM is accessed according to both the first and second address signals.

8. The character display device as claimed in claim 1 wherein said video RAM has input and output interfaces, and said device further comprises data selecting means connected to said input and output interfaces for connecting said video RAM to said CPU for transferring character display data between said CPU and said video RAM when said video RAM is accessed in response to said first address signal, and for connecting said video RAM to said television signal generation means for transferring character display data between said video RAM and said television signal generation means when said video RAM is accessed in response to said second address signal.

* * * * *